A. S. HOWELL.
MOTION PICTURE CAMERA AND TRIPOD.
APPLICATION FILED APR. 28, 1919.

1,417,523. Patented May 30, 1922.
8 SHEETS—SHEET 1.

Inventor
Albert S. Howell
By
Miehle & Miehle,
Attorneys.

A. S. HOWELL.
MOTION PICTURE CAMERA AND TRIPOD.
APPLICATION FILED APR. 28, 1919.
1,417,523. Patented May 30, 1922.
8 SHEETS—SHEET 2.
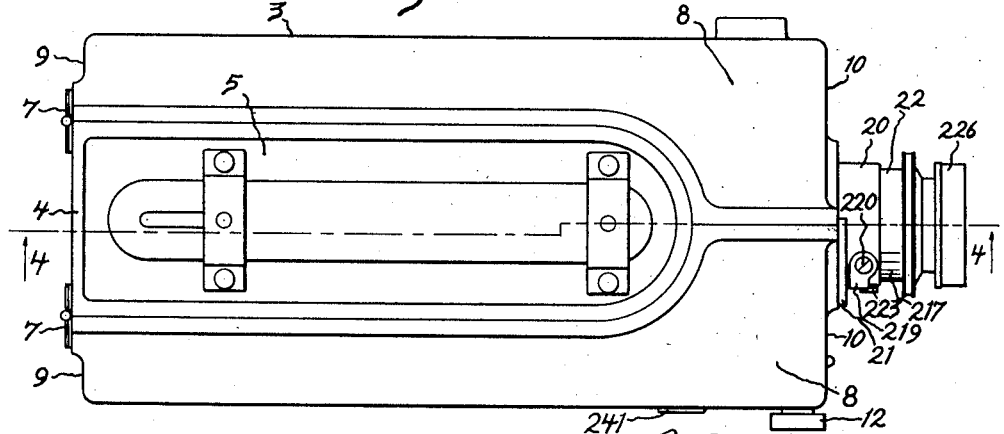
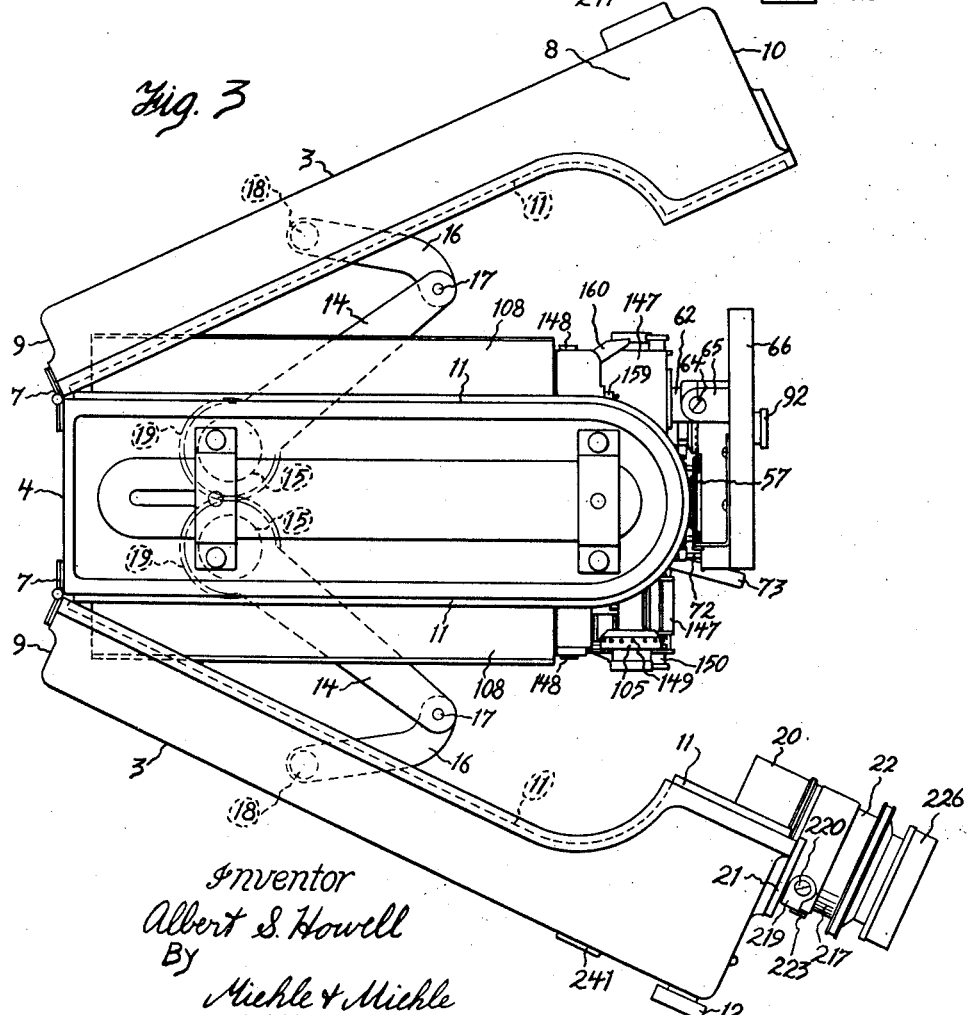
Inventor
Albert S. Howell
By
Miehle & Miehle
Attorneys.

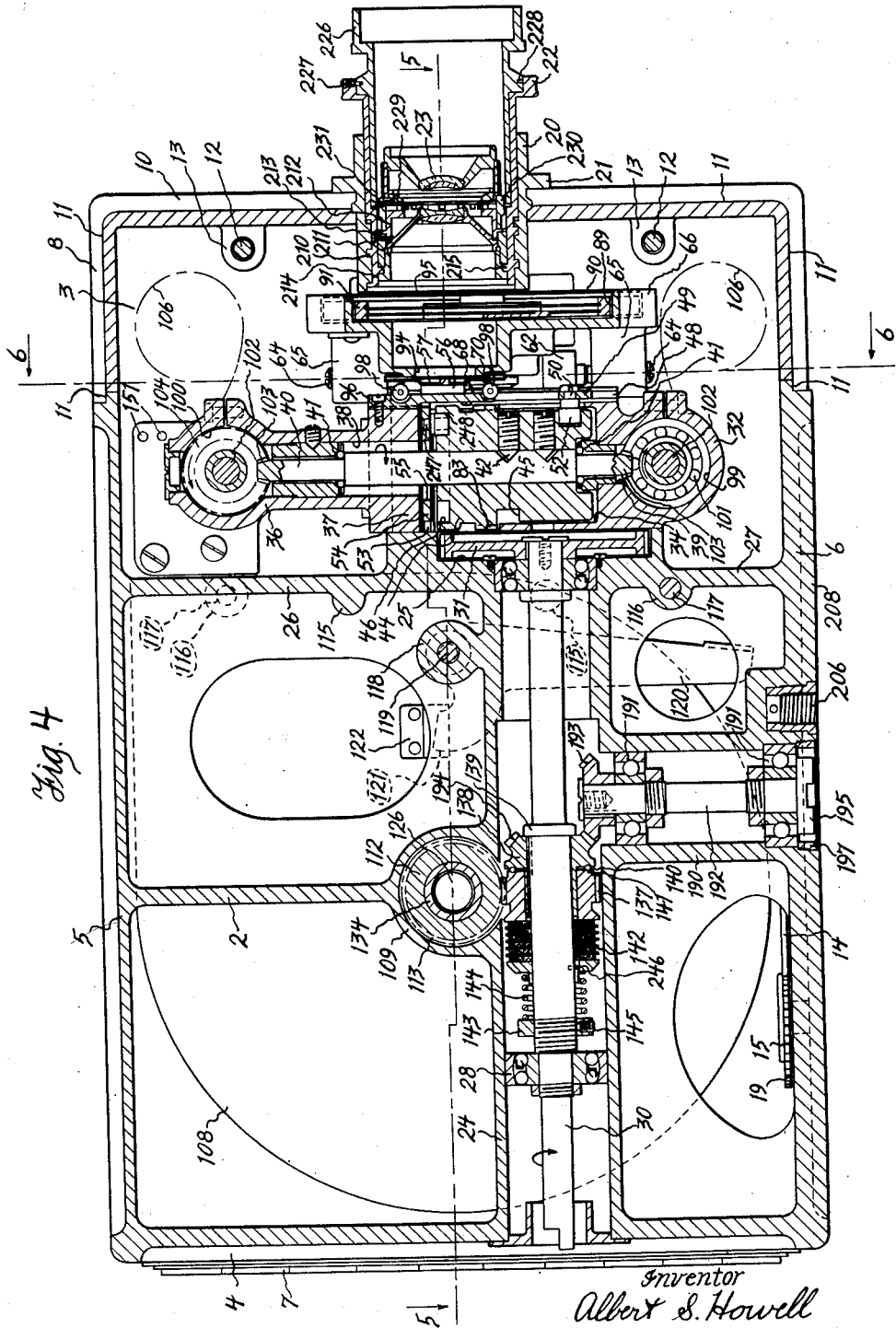

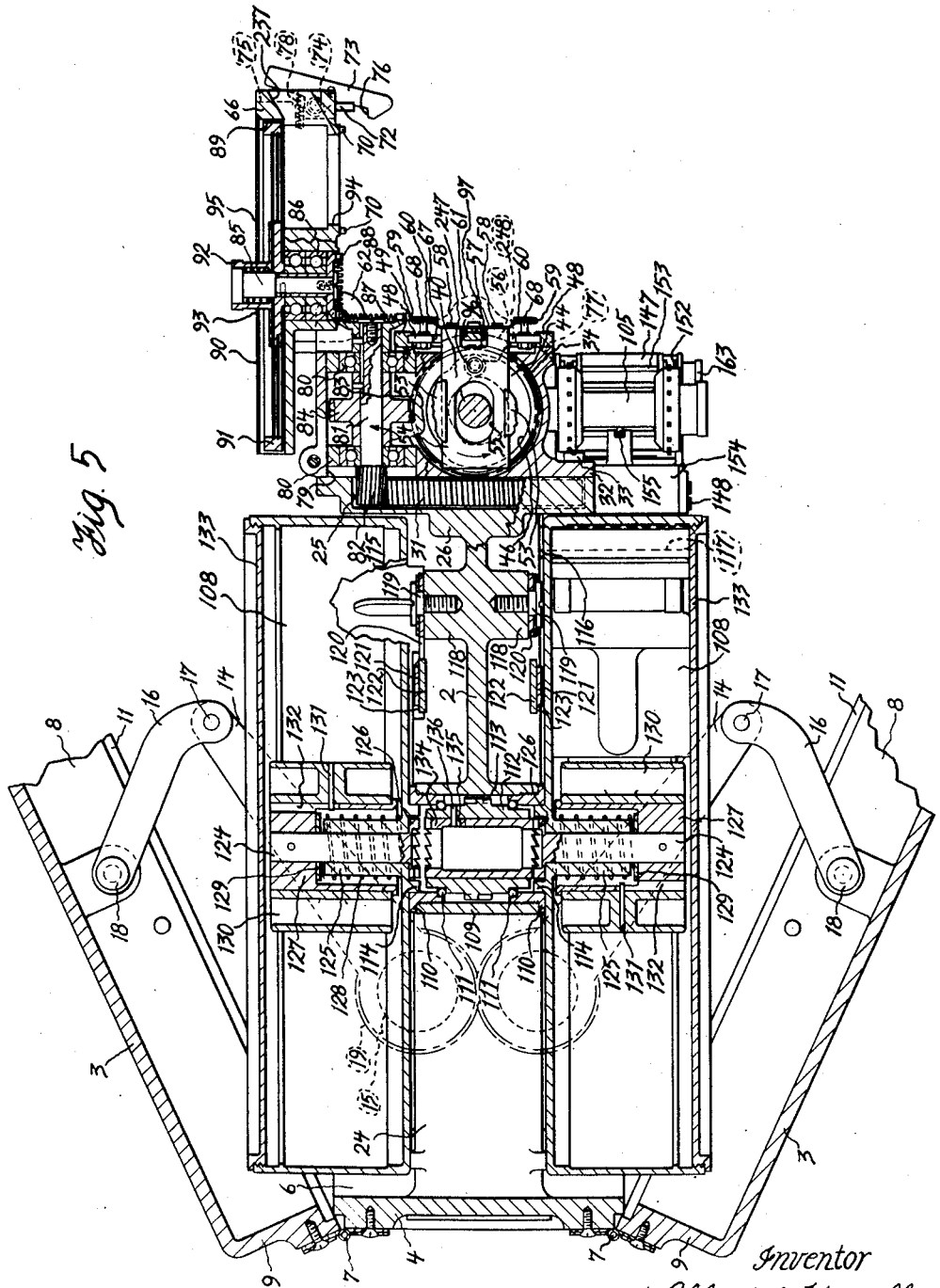

A. S. HOWELL.
MOTION PICTURE CAMERA AND TRIPOD.
APPLICATION FILED APR. 28, 1919.

1,417,523.

Patented May 30, 1922.

Inventor
Albert S. Howell
By
Miehle & Miehle
Attorneys

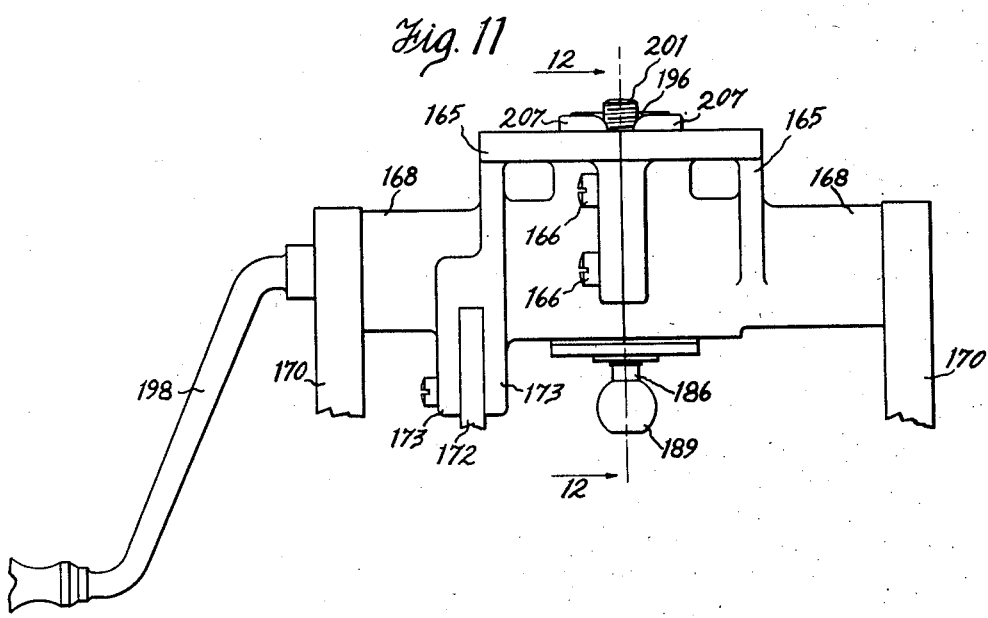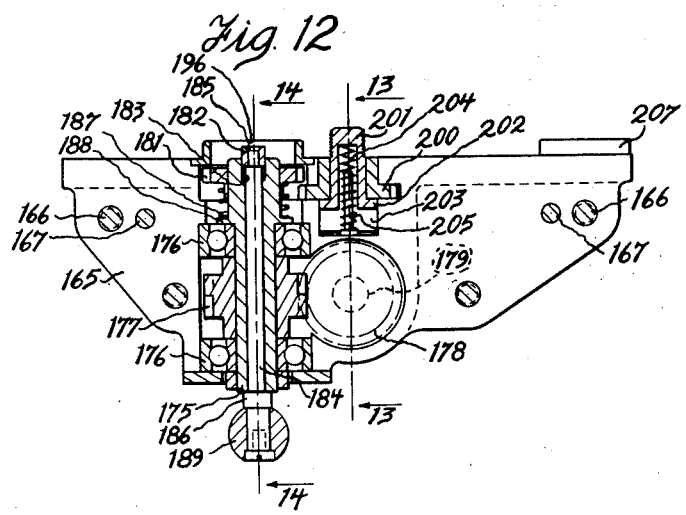

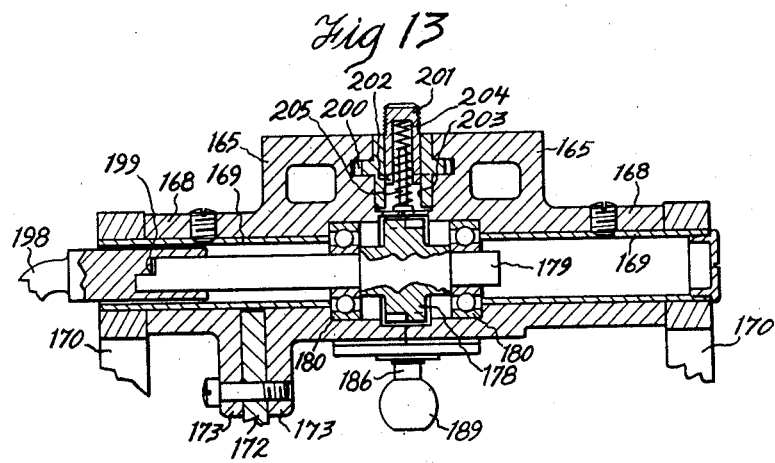
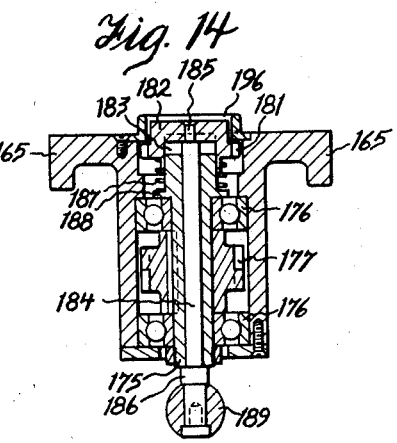

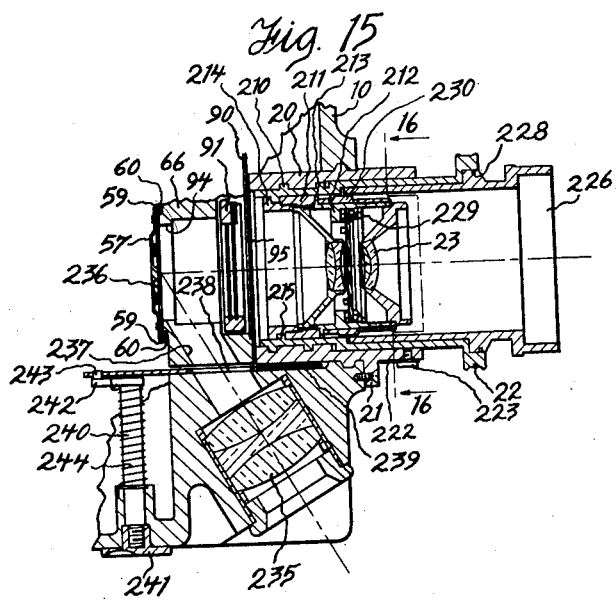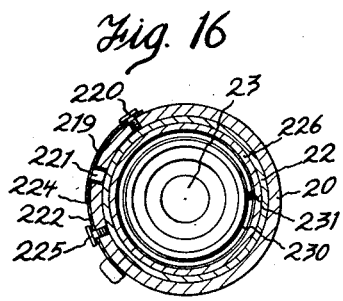

UNITED STATES PATENT OFFICE.

ALBERT SUMMERS HOWELL, OF CHICAGO, ILLINOIS, ASSIGNOR TO BELL & HOWELL COMPANY, OF CHICAGO, ILLINOIS, A CORPORATION OF ILLINOIS.

MOTION-PICTURE CAMERA AND TRIPOD.

1,417,523.  Specification of Letters Patent.  Patented May 30, 1922.

Application filed April 28, 1919. Serial No. 293,249.

*To all whom it may concern:*

Be it known that I, ALBERT S. HOWELL, a citizen of the United States, residing at Chicago, in the county of Cook and State of Illinois, have invented a certain new and useful Improvement in Motion-Picture Cameras and Tripods, of which the following is a full, clear, concise, and exact description, reference being had to the accompanying drawings, forming a part of this specification.

My invention relates to motion picture cameras and tripods, particularly those of the enclosed magazine type, although many of the features thereof are not limited to this use alone.

Certain features of the invention relate to a construction, combination, and arrangement of frame and closures with a view toward strength, rigidity, ease of manufacture and accessibility of operating parts, and frame, closures, and operating parts with a view toward compactness, strength, rigidity, ease of manufacture, accessibility of operating parts, and the provision of an enclosed film magazine type of camera of convenient dimensions.

Another feature relates to a film guide movable to and away from operating position which is adapted to be engaged by the closure of the camera to prevent the closing thereof when the film guide is not in its film guiding position whereby the camera is prevented from being closed and operated when said film guide is not in operating position.

Another feature relates to the provision of a continuous film guide from the film drive sprocket to the opening of the film magazine whereby in the event that the driving mechanism of the film magazine shaft fails to operate the film will not loop and buckle on the outside of the magazine between the film sprocket and the opening of the magazine.

Another feature relates to the provision of an operating crank mounted on the tripod of a motion picture camera and having connection with the drive shaft of the camera whereby the operating handle is in a convenient position lower than the camera and whereby the possibility of detrimental vibration or movement of the camera caused by operation of the crank is reduced due to the fact that the crank is nearer to the ground. A supplemental feature to this relates to a detachable driving connection between the tripod and camera to permit detachment of the tripod from the camera. A further supplemental feature relates to means for quickly and easily securing the tripod head to the camera which utilizes the rotation of the operating crank to effect the securing of the tripod to the camera and the detachment of the same therefrom, and which in its preferred embodiment allows the camera to be placed on the supporting surface of the tripod in its attached position before the securing means is operated to secure the same thereto and before the coupling of the driving connection between the crank and camera is effected whereby the attachment or detachment of the camera and tripod is easy and not liable to injure the securing means or driving coupling, and whereby film, which may be in the camera, is not wasted in the operation of this mechanism.

The above features and certain other features hereinafter appearing are embodied in the preferred form of my invention hereinafter fully described and illustrated in the accompanying drawings, and are effected by certain novel constructions, combinations and arrangements of parts particularly pointed out in the claims.

In the said drawings Figure 1 is a view in side elevation of the camera and tripod of my invention.

Figure 2 is a top plan view of the camera.

Figure 3 is a top plan view of the same in open position.

Figure 4 is an enlarged sectional view in side elevation substantially on the line 4—4 of Figure 2.

Fig. 5 is an enlarged sectional view in top plan elevation substantially on the line 5—5 of Fig. 4.

Fig. 11 is an enlarged partial view in front elevation of the tripod of my invention.

Fig. 12 is a partial sectional view of the same in side elevation substantially on the line 12—12 of Fig. 11.

Fig. 13 is a partial sectional view of the same in front elevation substantially on the line 13—13 of Fig. 12.

Fig. 14 is a partial sectional view of the same in front elevation substantially on the line 14—14 of Fig. 12.

Fig. 15 is a sectional view in side elevation of the camera lens bush above referred to.

Fig. 16 is a partial sectional view on the line 16—16 of Fig. 4.

Like characters of reference indicate like parts in the various views.

Figure 1:
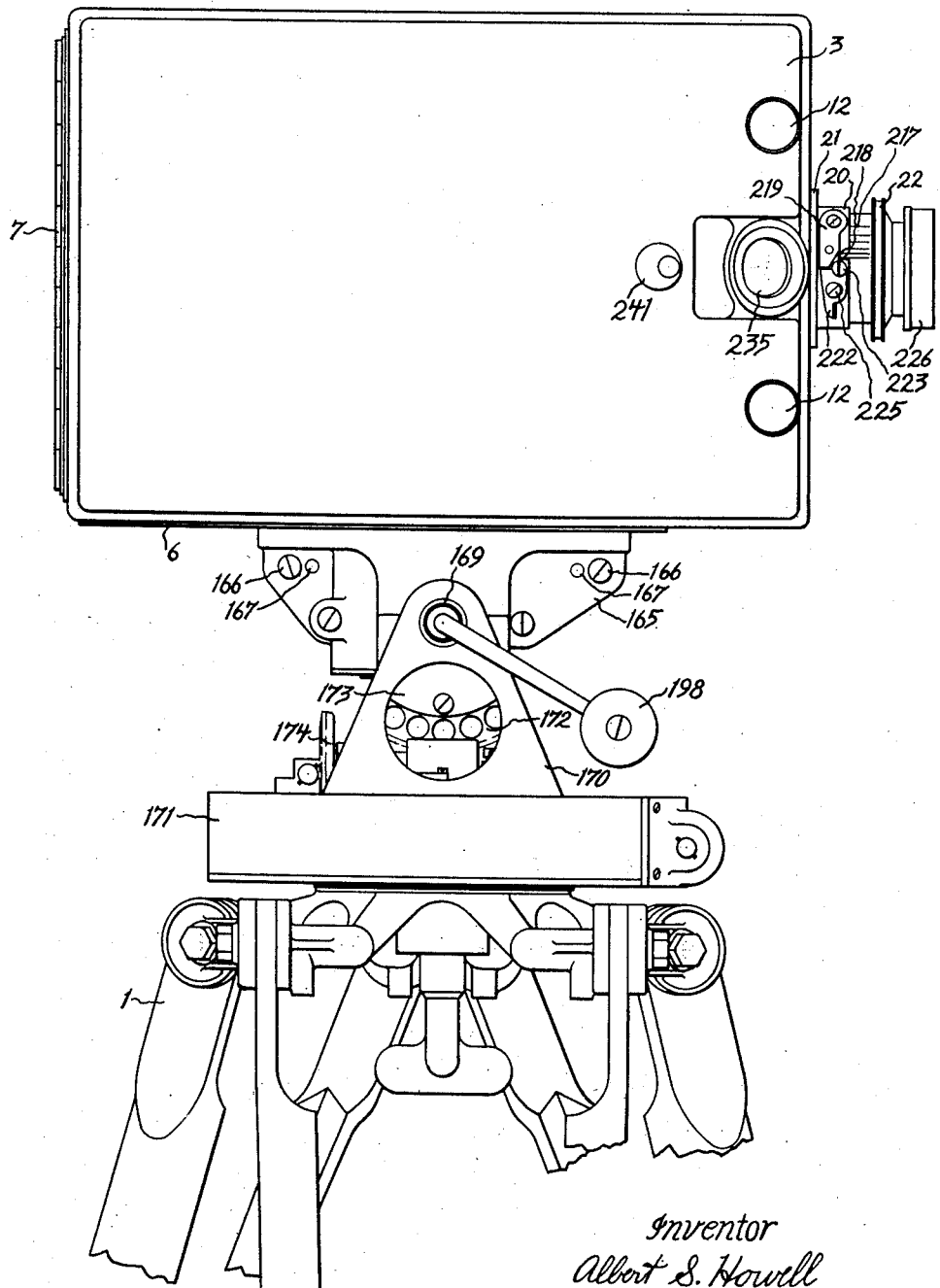

In the drawings 1 indicates generally a tripod upon the tilting head of which is mounted the camera.

The casing of the camera is formed of a central frame 2 and a closure 3 fitted to the central frame on either side thereof to form an enclosure thereabout within which the operating parts of the camera are disposed. The central frame is provided with a rear wall 4, an upper wall 5 and a lower wall 6, see Fig. 4, and the closures 3 are connected to the side edges of the rear wall by hinges 7 having their ears secured respectively to the rear wall 4 and closures 3 adjacent the meeting edges of said rear wall and closures. The said upper and lower walls of the central frame do not extend the full length of the camera and the closures 3 extend forward of the upper and lower walls of the central frame and are provided with upper and lower wall portions 8 meeting in front of the upper and lower walls of the central frame when the closures are in closed position. The said rear, upper and lower walls of the central frame do not extend the full width of the camera and said upper and lower wall portions 8 of the closures extend rearwardly and are complemented by rear wall portions 9 continuing the rear, upper and lower walls of the central frame to the full width of the camera. The closures 3 are also provided with front wall portions 10 meeting, when the closures are in closed position, to form the front wall of the camera. By reason of the fact that the closures are hinged to the rear wall of the camera they are completely out of the way when in open position, see Fig. 3, which shows the closures only partially open due to the lack of space, but it will be noted that because of this construction said closures may be swung normal to their closed positions in line with the rear wall of the camera in which position the operating parts are completely accessible. The meeting edges of all the wall portions above mentioned are stepped correspondingly as indicated at 11 to prevent the ingress of light, and the corresponding step edges of said wall portions on opposite sides of the camera are stepped oppositely to prevent relative motion of the parts in both directions normal to the respective opposite walls. When in closed position the closures are secured on said central frame by these stepped edges cooperating with the hinges 7 and headed screws 12, disposed at the front end of the camera normal to the sides thereof, passing through corresponding apertures formed in one of said closures and screw threaded into corresponding bosses 13 formed on the inside of the other closure.

The movements of said closures to and from closed position are synchronized by means of a pair of levers 14 having their inner ends pivotally mounted on spaced studs 15 secured to the lower wall 6 on parallel axes and disposed on the inside of the enclosures, and links 16 having their one ends pivotally connected at 17 to the outer ends of respective levers 14 and having their other ends pivoted on studs 18 formed on the inside of the lower walls of the respective closures, and meshing segment gears 19 formed at the inner ends of levers 14.

The meeting edges of the front wall portions 10 of the closures are provided with oppositely disposed semi-circular concave portions disposed to form a circular opening in the enclosure when the closures are in closed position, and mounted in this opening is a bush 20 provided with a flange 21 which is secured to the front wall portion of one of the closures. A second bush 22 is mounted within said bush 20 in a manner hereinafter to be described, and said second bush carries a camera lens 23 of usual construction within the bore thereof. Thus the camera lens is carried on one closure and moves therewith into open position to permit access to the shutter and film moving mechanism including step by step mechanism, hereinafter to be described, which are mounted on the central frame.

As above described the central frame is provided with a rear wall 4, upper wall 5 and lower wall 6. Extending horizontally from the rear wall 4 is a tubular formation 24 spaced from the upper and lower walls 5 and 6 and terminating at its front end in an enlargement in which the bore of the formation is enlarged as indicated at 25, the front end of this formation being supported by ribs 26 and 27 respectively extending between the upper wall portion of the central frame and the formation and the lower wall and the formation. Mounted for rotation on bearings 28 within the bore of this formation is a horizontal shaft 30, and affixed to the front end of this shaft within the enlarged bore 25 is a gear 31. The front end of the formation is faced in a vertical plane just in front of the gear 31, and a supplemental frame 32 is secured to this face by headed screws 33, see Figs. 5 and 6, and encloses the front end of said enlarged bore 25. This supplemental frame is bored vertically, as indicated at 34, and has a horizontal face at its upper end. See Figs. 4 and 5. Secured to this face of the supplemental frame by means of headed screws 35 is an extension frame 36 having a turned extension 37 at its lower end projecting downwardly into the upper end of the bore 34 and engaging the sides thereof to center the extension frame with said bore. The extension frame 36 is provided with a vertical bore 38 smaller than bore 34 and disposed concentrically thereto, and the bore 34 is restricted at the lower end of the frame 32 to form a small bore 39 disposed concentrically to said bore 34. Extending though bores 34, 38, and 39 is a vertically disposed shaft 40 which is mounted on a bearing 41 disposed adjacent each end of the shaft and supported respectively in bores 38 and 39.

Secured upon the shaft 40 by means of set screws 42, screw threaded into it and engaging respective conical depressions formed in the shaft, is a cam cylinder 44. The lower end of this cam cylinder forms a drum cam having a cam groove 45 and the extreme upper end of this cam cylinder forms a face cam having a cam groove 46 facing upwardly.

Figure 6:
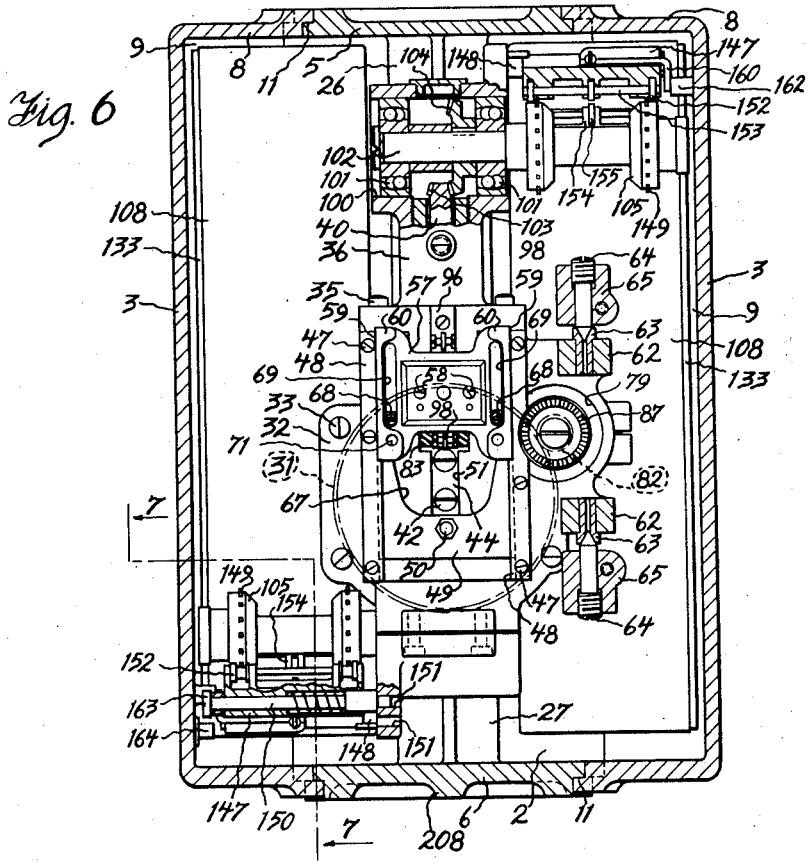
Fig. 6 is an enlarged sectional view in front elevation substantially on the line 6—6 of Fig. 4.

The front side of the supplemental frame 32 is faced in a vertical plane and secured to this face by headed screws 47, see Fig. 6, in parallel spaced relation and extending vertically is a pair of slides 48 having vertical grooves facing each other. A shuttle 49 is disposed between these slides and has its side edges engaging respective of said grooves to form a slide mounting for the shuttle. Mounted on the shuttle adjacent the lower end thereof and disposed midway between the slides 48 is a stud 50 which extends inwardly toward shaft 25 through a vertical slot 51 in the supplemental frame 32, and mounted for rotation on the inner end of this stud is a roller 52 which is engaged with the cam groove 45 of the drum cam whereby the shuttle is reciprocated in a vertical path parallel to the axis of the cams as the cams are rotated.

The lower end of the turned extension 37 of the extension frame 36 is disposed some distance above the upper end of the cam cylinder, and secured on the bottom of said extension 37 and extending in a forward and rearward direction is a second pair of slides 53 having horizontal grooves disposed normal to the plane of said shuttle and disposed in parallel spaced relation facing each other. The slides 53 are disposed on either side of shaft 40, and a slide block 54, having an aperture 55 through which shaft 40 passes, see Fig. 5, has its side edges engaging respective of said grooves to form a slide mounting for the slide block. A downwardly extending stud 247 is secured to the the slide block just forward of the aperture 55, and mounted on this stud is a roller 248 which is engaged in the cam groove 46 whereby the slide block is reciprocated in a horizontal path normal to the path of the shuttle 49. The slide block extends forwardly through an opening in the supplemental frame and the front end thereof is provided with two spaced downwardly extending legs 56 disposed one at each side of the slide block. Disposed just in front of the shuttle is a register leaf 57 which has its rear broad side secured to said lugs by headed screws 58. This register leaf has one complete broad side, the rear of which is secured to lugs 56, and has parallel edges 59, the edges that are parallel to the path of the shuttle 49, upstanding therefrom to form edge guides for the film, and retaining portions 60 extending from said edges toward each other in spaced relation with said complete broad side and spaced from each other throughout the entire length of the leaf to leave the center portion of this side open whereby a film may be inserted in the register leaf therethrough by bending the film lengthwise to permit the side edges thereof to pass through said opening, as designated in the dotted lines at 61 in Fig. 5. This register leaf is preferably formed of a piece of sheet metal formed and bent into the shape above designated.

Formed on the supplemental frame 32 and extending to one side and in front thereof is a pair of supports 62 disposed in vertical spaced relation with each other. A bush 63 is fitted to each support at the outer end thereof. These bushes are disposed coaxially on a vertical axis and the upper bush has an upwardly facing conical depression and the lower bush has a downwardly facing conical depression, which receive respective conical ends of adjustable bearing screws 64 screw threaded into respective wings 65, disposed respectively above and below the supports 62, of a shutter frame 66 whereby the shutter frame is pivotally mounted for limited swinging movement upon the supplemental frame 32, which shutter frame, when closed, see Fig. 4, lies transversely just in front of register leaf 57, and which, when open, see Fig. 5, lies longitudinally to one side of said register leaf to allow the film to be inserted into the register leaf as above described and to permit access to the mechanism.

The upper center portion of the shuttle 49 is cut away as designated at 67 to allow vertical reciprocal movements thereof without interference with slide block 54, and mounted, one on each side of the shuttle, at the upper end thereof are two shuttle pins 68 projecting forwardly therefrom. When the register leaf is positioned in its rear position these shuttle pins project through respective vertical slots 69 formed in the rear side of the register leaf and engage the usual side perforations in a film held in the register leaf and move the same upwardly with the upward movement of the shuttle. Mounted on the rear side of the shuttle frame and projecting rearwardly therefrom and disposed below the lowest position of the shuttle pins 68 is a pair of stationary pilot pins 70 which are spaced in a horizontal plane and adapted, when the shutter frame is in closed position, see Fig. 4, and the register leaf is in its forward position, to project through respective apertures 71 formed in the retaining portions 60 and the rear side of the register leaf and to engage perforations in the film to insure the film remaining stationary while the shuttle pins are not in engagement with perforations thereof. In the operation of this step by step mechanism the movements of the shuttle take place in the following order by reason of the timed relation of the cam grooves 45 and 46 which actuate the shuttle 49 and register leaf 57 in reciprocal paths normal to each other as hereinbefore described. Starting in the cycle of operation, as shown in Figs. 4, 5, and 6, where the shuttle is at the lower end of its stroke, the register leaf is in its forward position to hold the film in engagement with the stationary pilot pins 70 projecting through apertures 71 to engage the film and hold it stationary. As the cam cylinder 44 turns, in a counter-clockwise direction, see the arrow in Fig. 5, the cam groove 45, acting through means hereinbefore described, moves the shuttle upwardly, perforations of the film being disengaged from the shuttle pins 68 during this movement by reason of the fact that the register leaf 57 is held in its forward position with the film therein forward of the path of said shuttle pins, perforations of the film being engaged with stationary pilot pins 70 when in this position. When the shuttle reaches the upper end of its movement the cam groove 46, acting through means hereinbefore described, moves the register leaf 57 rearwardly to disengage perforations of the film from stationary pilot pins 70 and to engage perforations of the film with shuttle pins 68. After perforations of the film have been engaged by the shuttle pins the cam groove 45 moves the shuttle and film downwardly, and after the shuttle has reached the lower end of its movement the register leaf and film are moved forwardly to disengage perforations of the film from shuttle pins 68 and to engage perforations of the film with stationary pilot pins 70 to complete the cycle of operation. My U. S. Patent No. 1,038,586, granted Sept. 17, 1912, concerns a step by step movement of this general character, but it will be noted that by arranging the path of movement of the shuttle in parallelism with the axis of the operating cams the device requires but little space transversely and permits of a very simple, compact and durable construction, and that the device is particularly adapted to an enclosed film magazine type camera. It will be noted further that by reason of the fact that the shutter frame is pivoted to the supplemental frame 32 in pivotal relation with the register leaf the register leaf is fully accessible and a register leaf of the above described character can be used to the best advantage. Attention is also directed to the fact that the stationary pilot pins of the step by step mechanism are mounted on the shutter frame where they do not interfere with the insertion of the film into the register leaf as above described. The shutter frame 66 is provided with a spacing stud 72 extending from the rear surface thereof to engage the front face of the adjacent slide 48 when the shutter frame is in closed position to position the same. See Fig. 3. The shutter frame is maintained in its closed position with stud 72 engaging the front face of the adjacent slide by means of a hook latch lever 73 pivoted on a vertically disposed pin 74 mounted on the shutter frame and disposed within a horizontal slot 75 formed in the shutter frame. This latch lever extends forwardly and rearwardly of the pin 74 and has a hook 76 facing forwardly when the shutter frame is in closed position, which hook engages the rear surface of the adjacent slide 48, at a point where the supplemental frame 32 is cut away, as designated at 77, see Fig. 5, when the shutter frame is in closed position to maintain the stud 72 in engagement with said adjacent slide 48. A coiled compression spring 78 is disposed in a horizontal bore of the shutter frame in front of the pin 74 and abuts the latch lever and the bottom of said bore and normally maintains the latch lever in locked position, see Fig. 5. The front end of the latch lever extends beyond the shutter frame so that it may be conveniently manipulated to move the shutter frame from its closed position.

As hereinbefore described the gear 31 is affixed to the front end of shaft 30 within the enlarged bore 25 enclosed by supplemental frame 32. The supplemental frame 32 is extended laterally at the side from which supports 62 extend and between the same, and a horizontal bore 79 is formed therein, see Fig. 5, parallel with shaft 30 and alongside and communicating with bore 34 of the frame 32 and enlarged bore 25. Disposed within this bore and supported therein on bearings 80 in parallelism to shaft 30 is a shaft 81. Formed on the rear end of this shaft and meshing with gear 31 is a gear 82. The cam cylinder has spiral gear teeth 83 formed thereon which mesh with a spiral gear 84 fixedly mounted on shaft 81 between bearings 80 whereby the cam cylinder is driven from shaft 30. A shutter shaft 85 is mounted in bearings 86 within a bore of the rear wall of the shutter frame 66, and is disposed to aline with shaft 81 when the shutter frame is in closed position. Fixedly mounted on the front end of shaft 81 is a forwardly facing crown wheel 87, and fixedly mounted at the rear end of shutter shaft 85 is a rearwardly facing crown wheel 88 meshing with gear 87. The pivotal axis of the shutter frame is so disposed with relation to these gears 87 and 88 that these gears are always in mesh regardless of the pivotal position of the shutter frame, see Fig. 5. When the shutter frame is in closed position all of the teeth of each of these gears are intermeshed.

It will be noted that by the construction just described the several driving parts are arranged compactly, thus allowing the same to be enclosed in their supporting frame work, and that these may be and are arranged within a narrow space without increasing the necessary height. Further it permits of a compact and efficacious universal drive to the shutter shaft whereby it is not necessary to break the driving train thereto when the shutter is moved to open position and to reestablish the same when it is closed.

It is necessary that the shutter shaft 85 make one revolution to each revolution of the cam cylinder 44. The intermeshing spiral gear teeth 83 and spiral gear 84 permit of this without enlarging the mechanism, either by multiplying the parts or separating the present parts to an inconvenient and possibly impractical degree. It will be noted that the pitch diameter of gear 84 is smaller than the pitch diameter of spiral gear teeth 83 whose size is controlled by the size of the cam cylinder 44. Therefore, to effect the present compact arrangement the spiral gear 84 has the same number of teeth as there are spiral gear teeth 83 and the angle of the gear teeth 83 with relation to the axis of the cam cylinder is greater than the angle of the teeth of spiral gear 84 with relation to the axis of shaft 81, in the present case this angle of spiral gear teeth 83 being 57° and the angle of the teeth of spiral gear 84 being 33°.

In the driving train above described, when pictures are being taken, the shaft 30 rotates in a clock-wise direction looking forward, as indicated by the arrow in Fig. 4, and the shaft 81 rotates oppositely, as indicated by the arrow in Fig. 5. The angles of spiral gear teeth 83 and spiral gear 84 are so disposed that the shaft 40 and cam cylinder 44 rotate in a counter-clockwise direction as before described. The shutter shaft 85 rotates in the same direction as does the shaft 81 by reason of the connection therebetween as hereinbefore described.

The shutter frame 66 has a forwardly facing enlarged bore 89 formed therein concentric with shutter shaft 85, and has a cover 90 secured to the front end thereof enclosing this bore. Mounted on the shutter shaft within this bore is a shutter 91 of the usual adjustable aperture type, the adjustment knob 92 of which extends through a concentric aperture 93 formed in the cover 90. See Fig. 5.

The rear wall of the shutter frame 66 is offset rearwardly in front of register leaf 57 and is provided with a "frame" aperture 94 through which the image is projected on the film in the register leaf and the surrounding edge of this aperture is extended rearwardly to lie within the retaining portion 60 of the register leaf to press the film in the register leaf against the forward face of the rear broad side of the register leaf when the register leaf is in its forward position. The cover 90 has an aperture 95 in alinement with the aperture 94 with relation to lens 23, and light is transmitted through both of these apertures upon the film when the shutter is in exposing position to expose the film in the register leaf.

Secured upon the extension frame 36 is a support 96 extending downwardly therefrom between lugs 56 of slide block 54, and rearwardly of register leaf 57, the slide block being cut away rearwardly between said lugs as indicated at 97, to clear this support in all positions of the slide block. A roller 98 mounted for rotation on this support on a horizontal transverse axis is disposed above and below the register leaf, and these rollers are disposed to engage the center of the film when the register leaf is in its rearward position and hold the same forwardly away from the rear broad side of the register leaf when the shuttle is moving the film in the register leaf to prevent scratching of the film by the register leaf. The cut away portion 67 of the shuttle is formed to clear this support in all positions of the shuttle.

The lower end of the supplemental frame 32 has a transverse horizontal bore 99 formed therein communicating with the lower end of the hereinbefore described bore 39 thereof. The upper end of the extension frame 36 has a transverse horizontal bore 100 formed therein communicating with the upper end of the hereinbefore described bore 38 thereof. Supported for rotation in each of these bores on two spaced bearings 101 is a film sprocket shaft 102 which is disposed normal to the shaft 40. See Figs. 4, 5 and 6. These shafts are disposed transversely of the camera and extend outwardly from their respective frames on opposite sides of shaft 40, the upper shaft 102 extending to the right from shaft 40 above the step by step mechanism and the lower shaft 102 extending to the left from shaft 40 below the step by step mechanism. See Fig. 6. A bevel gear pinion 103 is formed at each end of the shaft 40, and each of these pinions meshes with a bevel gear 104 fixed upon the adjacent shaft 102 and disposed between the respective bearings 101. These bevel gear connections are so arranged that the shafts 102 rotate in the same direction, as the mechanism is operated. A film sprocket 105 is fixed on the extending ends of each shaft 102 in the usual manner, and in the operation of the machine the film passes over the upper film sprocket 105 in front of which it makes a downward spiral right hand loop, after which it passes downwardly through register leaf 57, and below this makes a second right hand loop and passes under the lower film sprocket 105 as indicated by the dot and dash line 106 in Fig. 4.

Thus the driving and supporting arrangement of the film sprockets 105 with relation to the step by step mechanism provides a very simple, strong and compact mechanism, the operating parts of which may be easily enclosed, and are in the form shown, and which is particularly adapted to an enclosed film magazine type camera.

Disposed one on each side of the tubular formation 24 of frame 2 and shaft 30 at the rear of respective film sprockets 105 and disposed in parallelism with each other is a pair of film magazines 108 the axes of which are coaxial. The axes of these film magazines are disposed in parallelism with said film sprockets and are coaxial with a transverse tubular formation 109 disposed above the tubular formation 24 and shaft 30 and normal thereto. Screw threaded into each end of the tubular formation 109 is a bearing cup 110, the inner ends of which form oppositely disposed ball races. These bearing cups are bored concentrically, and supported concentrically thereof for rotation thereon, by balls 111 engaging respective of said oppositely disposed races, formed at the inner ends of the bearing cups, and engaging respective oppositely disposed ball races formed thereon, is a gear sleeve 112 having spiral gear teeth 113 formed on the periphery thereof between the cups 110 whereby the gear sleeve is driven by means hereinafter described. The inner walls of the film magazines have circular ribs 114 formed on the outer faces thereof concentric with the axes thereof which fit into the bores of the respective bearing cups 110 to center the magazines upon the frame 2 coaxially with gear sleeve 112. These outer faces of the magazines engage the outer faces of the respective bearing cups 110 and in addition engage faces of respective extensions 115 and 116 extending laterally respectively from ribs 26 and 27 from respective sides faced in the plane of the outer surface of the respective bearing cup 110. The shape of the magazines in a plane normal to their axis is defined by three quarters of a circle and two oppositely extending tangents thereof meeting at an angle of 90°, see Fig. 4. The magazines are disposed in the camera so that one tangential side portion of each magazine is disposed vertically and faces the respective film sprocket. The extensions 116 are disposed adjacent the vertical side of the respective magazine and are provided with studs 117 extending laterally from the surface thereof and engaging transverse holes formed in the adjacent wall of the respective magazines to cooperate with the respective circular ribs 114 to locate the magazines on the frame 2. See Figs. 4 and 7. The extensions 115 and 116 and bearing cup 110 of each magazine are separated from each other but form a surface to which the respective magazine is secured. Formed on the central frame 2 are bosses 118 extending transversely on either side thereof. These bosses do not extend as far as the surface formed by respective bearing cups 110 and extensions 115 and 116, and pivoted upon respective studs 119 extending transversely at the ends of respective bosses are lock levers 120. These lock levers are provided with lock portions 121 disposed within the dimensions of the supporting surface of the respective magazine. The inner surface of each magazine is provided with a lug 122 also disposed within the dimensions of said supporting surface of the respective magazine, which lug has a surface 123 facing in the same direction as the supporting surface. See Fig. 5. The lock portion 121 of each lock lever is adapted when in one pivotal position, to engage this surface of the respective lug and hold the respective magazine in its located position on its supporting surface. The lock levers 120 are provided with actuating portions extending beyond the supported surface dimension of the respective magazine to permit the easy manipulation of the same. By this means the magazines may be easily and quickly attached to and detached from the frame 2 and when attached are firmly held in place.

Each film magazine 108 is provided with a shaft 124, see Fig. 5, which is disposed in axial alinement with gear sleeve 112 and mounted for rotation in a concentrically bored hub 125 within the enclosure of the magazine and formed on the inner wall thereof. The inner end of each shaft 124 has an enlarged clutch portion 126 forming a shoulder engaging the inner face of the inner wall of the respective magazine to provide a thrust bearing to prevent movement of the shaft outwardly. Each shaft 124 extends outwardly beyond the outer end of respective hub 125 and has an arbor 127 secured thereon which extends inwardly therefrom with a concentric cylindrical portion spaced from the periphery of the hub 125 and forming an enclosure thereabout. A coiled compression spring 128 is disposed within this enclosure and abuts the inner wall of the respective magazine and a friction ring 129, encircling the shaft 124 between hub 125 and arbor 127, with its opposite ends to retain the shoulder of the enlarged clutch portion 126 in engagement with the inner face of the inner wall of the magazine and to provide a light frictional resistance against rotation of shaft 124. Winding reels 130, upon which the film is wound, are mounted on respective arbors 127 and are driven therefrom by radial pins 131, secured in the winding reels, engaging respective longitudinal slots 132 formed in the peripheries of the arbors and extending to the outer ends of the arbors to permit the removal of the winding reels therefrom. The usual covers 133 form the outer walls of the film magazines and are screw threaded thereto to permit access to the interior of the magazines.

The shafts 124 and the gear sleeve 112 are disposed in axial alinement, the shafts being disposed at opposite ends of the gear sleeve. The gear sleeve is bored concentrically throughout its length and a clutch sleeve 134 is mounted therein for rotation and for longitudinal movement therein. The clutch sleeve is provided with a short spirally disposed slot 135 engaged by an inwardly extending radially disposed stud 136 mounted on the gear sleeve whereby a driving connection is established between these sleeves to allow limited rotatory and longitudinal movement of the clutch sleeve with relation to the gear sleeve. The clutch portions 126 of the shafts 124 are provided with inwardly facing backed off radially disposed clutch teeth, and the ends of the clutch sleeve are provided with corresponding backed off radially disposed clutch teeth adapted to engage the clutch teeth of the adjacent clutch portion 126 to establish a driving connection in one direction with the respective shaft. These clutch teeth are arranged so that the clutch sleeve will drive the respective shafts 124 in opposite directions and will drive one or the other shaft 124 depending upon the direction of rotation of the clutch sleeve. As the direction of rotation of the gear sleeve is reversed stud 136 acting in spiral slot 135 moves the clutch sleeve longitudinally to engage the clutch teeth at the opposite end thereof with the clutch teeth of the other clutch portion to drive the same in a direction opposite that in which the other clutch portion was driven before said reversal. The spiral gear teeth 113 of gear sleeve 112 mesh with a spiral gear 137 rotatably mounted on sleeve 138 fixed upon the shaft 30. The forward end of the sleeve 138 engages a shoulder 139 formed on shaft 30 to prevent forward movement of said sleeve on the shaft, and the portion of the sleeve in front of gear 137 is provided with a rearwardly facing shoulder 140, and a thrust ball bearing 141 is disposed between the front face of gear 137 and this shoulder to provide a forward thrust bearing for the gear. Rotatably supported upon shaft 30 rearwardly of gear 137 is a series of clutch plates 142, preferably alternating felt and metal plates, the rearward plate of which is metal and is mounted for longitudinal movement on shaft 30, this plate being secured to said shaft with relation to rotation thereon by a radially disposed stud 246 secured on the shaft and engaging a longitudinal slot formed in the bore of this plate. An adjusting collar 143 is screw threaded upon shaft 30 rearwardly of these plates and spaced therefrom. A coiled compression spring 144 encircles the shaft 30 between the clutch plates and collar 143 and abuts the rearward plate and the collar with its opposite ends to complete a frictional drive between the shaft 30 and gear 137. The adjusting collar 143 is maintained in adjusted position on shaft 30 by a set screw 145 screw threaded into said collar and engaging the shaft 30. The mechanism just described constitutes a frictionally driven take-up mechanism and needs no further description except to state that the take-up mechanism is adapted to drive the shaft 124 of the left hand film magazine, in Fig. 6, in a direction, clockwise in Fig. 4, to wind film fed thereto from lower film sprocket 105 when the operating parts are actuated in a forward direction to take pictures as hereinabove described, and that it is adapted to drive the shaft 124 of the right-hand film magazine, in Fig. 6, in a direction counterclockwise in Fig. 4, to wind film fed thereto from upper film sprockets 105 when the operating parts are actuated in a reverse direction as is desirable at times in the operation of the machine.

Figure 7:
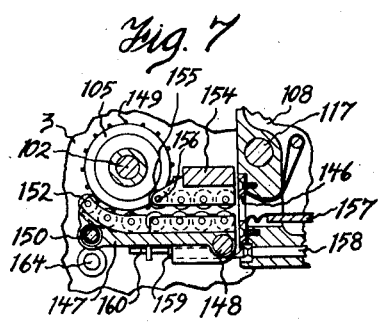
Fig. 7 is an enlarged partial sectional view in side elevation substantially on the line 7—7 of Fig. 6.
Figure 10:
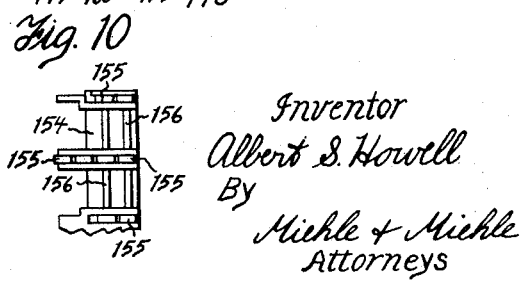
Fig. 10 is a bottom plan view of another of the elements shown in Figs. 7 and 8.

The vertically disposed tangential side portion of each film magazine 108 is provided with a film opening 146, which film openings are disposed in alinement with the respective film sprocket 105, see Fig. 7. A film guide frame 147 is provided for each film sprocket and extends over the film engaging portion of the respective film sprocket up to a point closely adjacent the opening 146 of the respective film magazine. Each guide frame is pivoted upon a stud 148 disposed on an axis parallel to that of the respective film sprocket and mounted on an extension of extension supplemental frame 32 or extension frame 36, as the case may be. These studs are disposed closely adjacent the respective opening 146 and permit of the guide frames being swung away from film guiding position and the respective film sprocket to allow the film to be engaged with the usual driving teeth 149 of the film sprockets. See Fig. 8. Spring actuated positioning studs 150 are slidably mounted in respective film guide frames at the free ends thereof and disposed on axes parallel to respective studs 148. The inner ends of these studs are reduced and are adapted to be engaged in respective pairs of holes 151 formed in respective of said extensions of the supplemental frame 32 and extension frame 36. See Fig. 6. These pairs of holes are so arranged that when the reduced end of either stud 150 is engaged in one of the holes of the respective pair, the respective film guide frame is in film guiding position, see Fig. 7, and when the reduced end of either stud 150 is engaged in the other hole of the respective pair, the respective film guide frame is in a non-film-guiding position, see Fig. 8, away from the respective film sprocket. These guide frames are provided with film rollers 152 rotatably mounted upon shafts 153 fixed upon the respective film guide frame on axes disposed transversely to the path of the film and disposed so that the rollers engage one face of the film. These rollers are arranged to engage the one face of the film adjacent both edges thereof while the film is passing over the respective film sprocket to hold the film with the perforation thereof in engagement with teeth 149 of the sprocket and to engage said one face of the film adjacent both edges and at the center thereof from the point where the film leaves the respective film sprocket on the magazine side thereof up to the opening 146 in the respective magazine. See Figs. 7 and 8. Stationary film guide frames 154, which are extensions respectively of said frame 32 and extension frame 36, are also provided for each film sprocket and extend from the respective film sprocket 105 to the opening 146 in the respective film magazine on the side of the path of the film opposite that upon which the aforementioned guide frames 147 are disposed. These guide frames 154 are provided with film rollers 155 rotatably mounted on shafts 156 fixed upon the respective film guide frame 154 on axes disposed transversely to the path of the film, see Fig. 10, and disposed so that the rollers 155 engage the face of the film, opposite the one that rollers 152 engage, adjacent both edges thereof and at the center thereof from the point where the film leaves the respective film sprocket on the magazine side thereof up to the opening 146 in the respective magazine. See Figs. 7 and 8. When the film guide frames 147 are in closed position the rollers 152 and 155 of the respective guide frames are separated just enough to allow the film to pass therethrough and are adapted to provide supports engaging the film on opposite faces thereof to prevent buckling and looping of the film between the film sprockets and respective magazines as the film is moved into the respective magazine, so that in the event that the film is not being properly wound upon the reel 130 of the respective magazine it will, nevertheless, be driven into the magazine to prevent the great portion of the film being light struck when the camera is opened.

Figure 9:
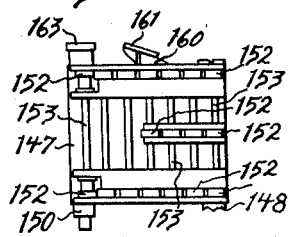
Fig. 9 is a top plan view of one of the elements shown in Figs. 7 and 8.

Each film magazine 108 is provided with a magazine valve mechanism for closing the openings 146 of the film magazines against the entrance of light when the camera is open, similar to that which is the subject matter of my U. S. Patent No. 1,215,534 granted Feb. 13, 1917, filed Feb. 6, 1915, and which is inclusive of a movable valve member 157 mounted in the magazine and controlled by a plunger 158 mounted in the magazine and a second plunger 159 movably mounted on the respective film guide frame 147 and abutting the end of plunger 158, the plunger 159 being controlled by a spring actuated bell crank 160, normally in valve closing position, which has a lug 161 at its free end which is normally disposed outwardly of the side of the respective guide frame when in valve closing position, see Fig. 9, and which is disposed inwardly of such position adjacent the side of the respective guide frame when in valve opening position, see Fig. 6, and projections 162 formed on the inside of each closure 3 in line with the respective lugs 161 are adapted to engage respective lugs 161 when the closures are in closed position to move the same inwardly to their valve opening position, to move the valve member 157 to its open position as shown in Fig. 7.

Figure 8:
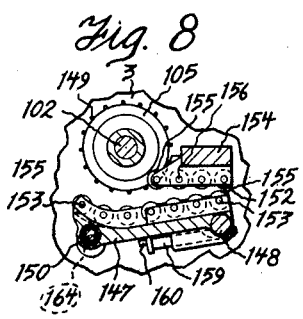
Fig. 8 is a similar view showing certain of the parts in a different position as hereinafter described.

The outer ends of the studs 150 are provided with enlarged positioning heads 163 extending outwardly of the adjacent sides of the respective film guide frames 147 and projections 164, formed on the inside of each closure 3 in line with the respective heads 163 of studs 150 when the respective film guide frames are in open position, see Fig. 8, are adapted to engage respective heads 163, when respective film guide frames 147 are in open position, to prevent the closing of the respective closures, these projections being disposed to clear the respective heads 163 when the respective film guide frames are in closed film guiding positions, see Figs. 6 and 7, to allow the closures to be moved into closed position. By this arrangement the closures cannot be closed unless said film guide frames 147 are in their film guiding positions whereby these film guide frames must be positioned in their closed positions to effect the closing of the camera.

The tripod 1 is provided as usual with a tilting head to the face of which the lower wall 6 of the central frame 2 of the camera is secured by means hereinafter described. See Fig. 1. This tilting head is formed of two parts 165 secured together in a vertical plane normal to the axis of the tilting head by means of headed screws 166 and dowel pins 167. See Figs. 11 and 12. These parts are provided with horizontally disposed alined tubular formations 168 disposed normal to said plane and extending oppositely, the bores of which receive bushes 169, these bushes extending outwardly of the respective tubular formations and having their ends journaled in respective supports 170 of the tripod base 171 to provide a pivotal support for the head. See Fig. 13. A worm gear sector 172 is affixed to extensions 173 of one of said parts 165 on an axis coincident with the axis of the head through which the angle of the head with relation to the base of the tripod is adjusted by the actuation of the usual mechanism 174 mounted on the base 171. See Fig. 1. A hollow vertically disposed shaft 175 is mounted for rotation on spaced bearings 176 in a vertical bore of the tilting head disposed to one side of and communicating with the bore of the tubular formations 168. See Figs. 12 and 14. Keyed to this shaft between the bearings 176 is a spiral gear 177 which meshes with a spiral gear 178 formed on a shaft 179 mounted for rotation on spaced bearings 180 in the bores of the tubular formations 168, the gear 178 and bearings 180 lying in corresponding enlargements formed at the inner ends of the bores of said tubular formations, and the bearings being disposed on opposite sides of said gear. Slidably mounted on the shaft 175 at the upper end thereof above bearings 176 and gear 177 is a spur gear 181 which has a diametrically disposed clutch element 182 affixed to the upper surface thereof, and the upper end of the shaft 175 is cut diametrically, as indicated at 183, to receive the center portion of the clutch element 182 for sliding movement therein to establish a driving connection between the shaft and the gear and clutch element. A stem 184 is mounted for sliding movement in the bore of shaft 175, and has its upper end affixed to the clutch element 182, as indicated at 185, see Figs. 12 and 14. The lower end of this stem extends below the lower end of the shaft 175 and is enlarged, as indicated at 186, to form an upwardly facing shoulder to limit the upward movement of gear 181 and clutch element 182. A coiled compression spring 187 encircles shaft 175 below gear 181 and above an eulargement 188 of the shaft and abuts said enlargement and the lower face of said gear with its opposite ends to normally maintain said gear and clutch element at the upper end of their movement as determined by the upwardly facing shoulder of the enlargement 186 of the stem, in which position the clutch element is disposed within the cut 183 to maintain the driving connections between shaft 175 and the gear 181 and clutch element 182. See Figs. 12 and 14. A knob 189 is affixed to the lower end of stem 184 which is exposed below the parts 165 whereby the stem 184 may be pulled downwardly against the influence of spring 187 to move said gear 181 and clutch element 182 to their lower positions for purposes hereinafter described.

The central frame 2 has a vertical tubular formation 190 formed therein communicating with the bore of horizontal tubular formation 24 thereof and extending downwardly therefrom to the lower wall 6, the bore of said tubular formation 190 extending through this wall. Mounted for rotation in the bore of this vertical tubular formation upon bearings 191 is a vertical shaft 192. An upwardly facing miter gear 193 is affixed to the upper end of this shaft and meshes with a forwardly facing miter gear 194 formed on sleeve 138 forward of the shoulder 140 thereof. The lower end of the shaft 192 is enlarged and slotted diametrically to form a downwardly facing clutch element 195 which is adapted to engage with clutch element 182 of shaft 175 of the tripod head to form a driving connection between these shafts when the camera is mounted on the tripod head as shown in Fig. 1. A centering ring 196 is secured upon the face of the tripod head in concentric relation to shaft 175 and uprises from said face and is adapted to engage the bore of a bearing retaining ring 197 secured to the lower wall 6 of the central frame 2 of the camera in concentric relation with the shaft 192 to center these shafts when the camera is mounted on the tripod. Thus is an operating connection established between the camera and the tripod, and the shaft 179 extends outwardly on one side within the bore of one of the tubular formations 168 and has its extending end formed to be detachably received into the bore of the hollow shaft of an operating crank 198, the shaft 179 and bore of the hollow shaft of the operating crank being formed to interlock, as designated at 199, to establish a driving connection therebetween. Thus the camera is operated by an operating crank mounted on the tripod whereby the crank is disposed in a low convenient operating position nearer to the ground to reduce possible vibration or movement of the camera. Further, by reason of the fact that the axis of the operating crank is coaxial with the axis of the tilting head it does not interfere with the operation of the tripod in any way and effects the drive of the camera through very simple mechanism, which mechanism includes detachable driving connections to allow removal of the camera from the tripod.

The camera is secured upon the face of the tilting head of the tripod in the following manner. The upwardly extending hub of a gear 200 is rotatably mounted on a vertical axis parallel to shaft 175 in a vertical bore of the tilting head of the tripod. This bore is enlarged to accommodate this gear and the opposite shoulders thus formed engage opposite sides of the gear to provide thrust bearings therefor. This enlarged portion of this bore communicates with the bore in which the gear 181, hereinbefore described, is disposed, and is adapted to mesh therewith when the gear 181 and clutch element 182 are moved downwardly on shaft 175, as hereinbefore described, and to be out of mesh therewith when said gear 181 and clutch element 182 are positioned at the upper end of their movement, as shown in Fig. 12. The gear 200 is bored concentrically and slidably mounted in this bore is a screw stud 201 having its screw threaded end normally projecting upwardly above the face of the tilting head and above the hub of the gear. The opposite end of this stud has a head formed into a clutch element 202 extending diametrically across the axis of the stud and disposed below the gear 200. See Figs. 12 and 13. The hub of gear 200 extends downwardly therefrom into a reduced portion of the bore in which it is disposed and has a diametrical cut 203 formed therein in which said clutch element 202 lies and is slidable therein and whereby a driving connection is formed between said gear 200 and screw stud 201. The screw stud 201 is bored concentrically from its bottom end, the upper end of this bore being closed, and the bore in which gear 200 is disposed terminates with a closed end just below the hub of said gear. A coiled compression spring 204 is disposed within the bore of screw stud 201 and a headed guide pin 205 has its shank disposed within the coil of spring 204 and has for its head at the lower end thereof engaging the lower closed end of the bore in which gear 200 is disposed, and the spring 204 engages this head and the upper closed end of the bore of screw stud 201 to normally maintain screw stud in its upper position projecting upwardly above the face of the tilting head of the tripod, which position is determined by the clutch element 202 abutting the web of gear 200. The screw threads of the screw stud 201 are adapted to be screw threaded into an internally screw threaded cup 206 secured in a bore of the lower wall 6 of the central frame 2 to secure the camera to the tilting head of the tripod. See Fig. 4. The face of the tilting head of the tripod has two spaced positioning lugs 207 formed thereon which are disposed at the extreme front end thereof and are disposed to engage the opposite sides of a central longitudinal rib 208 formed on the lower surface of the lower wall 6, see Fig. 6, to cooperate with centering ring 196, hereinbefore described, to properly position the camera on the face of the tilting head. When the camera is positioned on the face of the tilting head with the centering ring 196 engaged in the bore of retaining ring 197 and lugs 207 engaging the opposite sides of the rib 208, the shafts 175 and 192 are in alinement as is likewise the screw stud 201 with the screw threaded cup 206. By reason of the fact that the clutch element 182 and screw stud 201 are held in their upper positions respectively by springs 187 and 204 the camera may be set upon the face of the tilting head without danger of injury to the clutch element 182 or screw stud 201 or their related parts. In mounting the camera on the face of the tripod the camera is first set thereon with centering ring 196 engaged in the bore of retaining ring 197 and with lugs 207 engaging the opposite sides of the rib 208. The knob 189 is then pulled downwardly to mesh gear 181 with gear 200. The operating crank 198 is then rotated which motion is transmitted to screw stud 201 through the meshing gears 181 and 200 and parts hereinbefore described. As the screw stud is rotated in the proper direction it screws into the threaded cup 206, the spring 204 acting to hold the screw stud against the cup. The crank is rotated until the screw stud clamps the camera upon the face of the tripod after which the knob 189 is released to allow spring 187 to move gear 181 upwardly out of mesh with gear 200 and to move clutch element 182 upwardly into engagement with clutch element 195 to establish a drive between the operating crank and the camera mechanism. In removing the camera from the tripod the knob 189 is pulled downwardly to move clutch element 182 downwardly out of engagement with clutch element 195 and to move gear 181 downwardly into mesh with gear 200, after which the operating crank 198 is rotated in the opposite direction to screw the screw stud 201 out of the threaded cup 206. The knob 189 may then be released and the camera removed from the tripod. The parts are so arranged that when gear 181 is in mesh with the gear 200 to rotate screw stud 201 the clutch element 182 is disengaged from clutch element 195 so that the camera mechanism is not operated while the camera is being secured on or detached from the head of the tripod.

As hereinbefore described the camera lens 23 is mounted within a bush 22 mounted within another bush 20 which is mounted in the circular opening formed by the oppositely disposed concave portions of the meeting edges of the front wall portions 10 of the closures and secured to one of the closures by means of a flange 21. The bush 22 has external screw threads 210 formed on the outer surface thereof at its rearward end which engage corresponding internal screw threads formed on the inner surface of bush 20 at the rearward end thereof. The camera lens 23 is secured within the bush 22 at the rear end thereof by means of an internally threaded ring 211 screw threaded upon the rear end of the lens body 212 against the usual flange 213 of this body and extending rearwardly therefrom and an externally flanged clamp ring 214 screw threaded into the rear end of the ring 211 and having its flange engaging the rear surface of an internal rib 215, formed on the bush 22, and clamping the rear end of the ring 211 against the front surface of this rib. See Fig. 15. A headed screw 216 is disposed radially in a countersunk hole in the bush 22 and is screw threaded into the ring 211 and engages a hole in the lens body 212 to maintain the lens body and bush 22 in proper relation. The screw threaded engagement of the bushes 20 and 22 provide a focal adjustment for the lens 23 and the screw threads 210 are preferably of such a pitch that the several focal adjustments of the lens are made within one revolution of the bush 22 with relation to bush 20. The portion of the bush 22 which extends in front of the bush 20 is provided with an index 217 which is co-related with a cut 218 formed in the adjacent edge of bush 20 to determine the adjustments of the lens, and by reason of the fact that the several adjustments of the lens are effected within one revolution of the bush 22 within bush 20, this index is a simple one and requires no calculation in the use thereof. By the lens mounting just described the quick interchange of lenses may be accomplished as the bush 22 is sufficiently large to accommodate a variety of lenses and each lens is mounted within a bush 22 adapted to fit within the bush 20 and having screw threads 210 adapted to engage the internal screw threads of bush 20, and in changing lenses it is only necessary to remove the bush 22 and to insert another bush 22, carrying the desired lens, into bush 20. Thus the screw threaded engagement of bushes 22 and 20 provides a lens adjustment and provides for a quick and easy interchange of lenses.

Mounted on the outer surface of bush 20 at the front end thereof in front of the front wall of the camera is a spring blade 219 which is disposed circumferentially of the bush and is secured thereto at its one end by a headed screw 220. See Figs. 1 and 15. The free end of this blade has a radially disposed pin 221 extending inwardly through an aperture in bush 20 to engage the bush 22 to provide a frictional engagement between the bushes to prevent accidental movement of bush 22 within bush 20. This frictional engagement may be broken to permit the easy removal of bush 22 within bush 20 by a blade 222 pivotally secured upon bush 20 by means of a headed screw 223 and having a beveled edge 224 disposed radially with respect to screw 223 and adapted, when the blade 222 is pivoted upon screw 223 in one direction, to move between the bush 20 and the free end of spring blade 219 to move this end of the spring blade away from the bush and to move pin 221 from engagement with bush 22. Another headed screw 225 passes through an enlarged aperture in blade 222 to limit the movement thereof.

The forward end of the bore of bush 20 is enlarged to accommodate the enlarged front end of bush 22, the front end of whose bore is also enlarged to receive a third bush 226, which is rotatable within bush 22 and is retained therein by a radially disposed screw 227 screw threaded into bush 22 and having its end engaging a circumferential groove 228 formed on the outer surface of said bush 226. The lens 23 is provided with a usual iris mechanism 229 which is controlled by an adjustment ring 230 mounted for limited rotation on the lens body 212, and a radially disposed pin 231 secured upon bush 226 engages a longitudinal slot in ring 230 to provide an operative connection between ring 230 and bush 226 whereby the adjustment of the iris of the lens may be effected by rotatory movement of bush 226 within bush 22.

A sight lens 235 is mounted within an opening in one of the enclosures 3, and is mounted on the same side of the focal plane of the camera lens 23 as the camera lens lies. The axis of this sight lens is disposed at an acute angle to the focal axis of the camera lens and is adapted to transmit the image reflected from the film to facilitate adjustment of the camera lens. See Fig. 15. Thus the image is projected upon the film 236 in the register leaf 57 and the sight lens transmits the image reflected from the film to the eye of the operator positioned in alinement with the sight lens just outside of the enclosure. This permits the operator adjusting the camera lens directly in accordance with the image on the film without calculating the conditions. The shutter frame 66 is provided with an opening 237 alined with the axis of the sight lens through which the image is reflected. The opening of the closure 3 in which the sight lens 235 is mounted is provided with a shutter 238 mounted, as usual, upon opposing grooved slides 239, and this shutter is operated from the outside of the camera by means of a shaft 240 rotatably mounted in a bore in this closure 3 and having an operating disk 241 mounted at its outer end and disposed on the outside of the enclosure of the camera and having a crank 242 at its inner end provided with a crank pin 243 engaging a transverse slot in the shutter. The shutter is normally maintained in closed position by a torsional spring 244 encircling shaft 240 and having its one end engaged in a hole in the enclosure 3 alongside of said shaft and having its other end engaging the side of the crank 242, the end of said transverse slot limiting the movement of the crank 242 by engagement with crank pin 243 to a portion of a revolution thus determining the open and closed positions of the shutter.

While I have described and shown the preferred embodiment of my invention I do not wish to be limited to the precise details of construction shown as changes may be readily made without departing from the spirit of my invention, but having thus described my invention I claim as new and desire to secure by Letters Patent the following:—

1. A device of the character described including a central frame having upper and lower walls; a closure fitted to said central frame on each side thereof to form an enclosure thereabout with said upper and lower walls, said closures extending beyond said upper and lower walls at one end and including upper and lower wall portions meeting to complete the enclosure; and means for securing said closures in closed position on said central frame and adapted to be actuated to allow movement of said closures away from their closed positions to permit access to the central frame.

2. A device of the character described including a central frame having rear, upper and lower walls; a closure fitted to said central frame on each side thereof to form an enclosure thereabout with said rear, upper and lower walls, said closures extending beyond said upper and lower walls at the front ends thereof and including upper and lower wall portions meeting to complete the enclosure; and means, including hinged connections between said rear wall and said closures, for securing said closures in closed position on said central frame and adapted to be actuated to allow movement of said closures away from their closed position to permit access to the central frame.

3. A device of the character described including a central frame having upper and lower walls; film moving mechanism mounted on said central frame between said walls; a shutter mounted on said central frame between said walls; a closure fitted to said frame on each side thereof to form an enclosure thereabout with said upper and lower walls enclosing said film moving mechanism and said shutter; said closures extending beyond said upper and lower walls at the front ends thereof and including upper and lower wall portions meeting to complete the enclosure; and means for securing said closures in closed position on said central frame and adapted to be actuated to allow movement of said closures away from their closed positions to permit access to said film moving mechanism and said shutter.

4. A device of the character described including a central frame; step by step mechanism mounted on said central frame; shutter mechanism mounted on said central frame; a closure fitted to said central frame on each side thereof to form an enclosure thereabout, said closures having front wall portions meeting; a lens mounted on the front wall portion of one of said closures; and means for securing said closures in closed position on said central frame adapted to be actuated to allow movement of said closures away from their closed position.

5. A device of the character described including a central frame; step by step mechanism mounted on said central frame; shutter mechanism mounted on said central frame; a closure fitted to said central frame on each side thereof to form an enclosure thereabout, said closures extending beyond said central frame at the front end thereof and having upper and lower wall portions and front wall portions meeting to complete the enclosure; a lens mounted on the front wall portion of one of said closures; and means for securing said closures in closed position on said central frame adapted to be actuated to allow movement of said closures away from their closed position.

6. A device of the character described including a central frame; step by step mechanism mounted on said central frame; shutter mechanism pivotally mounted on said central frame; a closure fitted to said central frame on each side thereof to form an enclosure thereabout, said closures having front wall portions meeting; a lens mounted on the front wall portion of one of said closures; and means for securing said closures in closed position and said central frame adapted to be actuated to allow movement of said closures away from their closed position.

7. A device of the character described including a central frame; step by step mechanism mounted on said central frame; shutter mechanism pivotally mounted on said central frame; a closure fitted to said central frame on each side thereof to form an enclosure thereabout, said closures extending beyond said central frame at the front end thereof and having upper and lower wall portions and front wall portions meeting to complete the enclosure; a lens mounted on the front wall portion of one of said closures; and means for securing said closures in closed position on said central frame adapted to be actuated to allow movement of said closures away from their closed position.

8. A device of the character described including a register leaf having a pair of parallel edges turned over in spaced relation to form a film guide whereby one broad side of the slide thus formed is throughout its length open for the insertion of a film therein.

9. A device of the character described including a register leaf having one complete broad side, parallel edges upstanding therefrom to form edge guides, and retaining portions extending from said edges toward each other in spaced relation with said broad side and leaving an opening between the same throughout the entire length of the leaf whereby a film may be inserted therethrough.

10. A device of the character described including a frame; a shutter frame pivoted thereto; step by step mechanism including a shuttle mounted for sliding movement on one of said frames, a register leaf also mounted for sliding movement on this frame and facing said shutter frame and having the center portion of the adjacent broad face thereof open throughout its length to permit the insertion of a film therein.

11. A device of the character described including a frame; a film guide including opposed guide devices mounted on said frame, one of which is mounted for movement to and from a film guiding position with respect to the other guide device; and a closure movably mounted with said frame and enclosing said film guide and to be engaged by said movable guide device when positioned away from the other guide device to prevent movement of said closure into its closed position.

12. A device of the character described including a film magazine having an opening through which the film enters the same, a rotatably mounted film sprocket; means for driving said sprocket to move the film into the magazine through said opening; and guide means maintaining said film in engagement with the sprocket and forming a continuous guide on both sides of the film from said sprocket to said opening to prevent buckling and looping of the film between said sprocket and opening.

13. A device of the character described including a film magazine having an opening through which the film enters the same, a rotatably mounted film sprocket; means for driving said sprocket to move the film into the magazine through said opening; a film guide pivotally mounted and extending from said opening over the sprocket to maintain a film in engagement with said sprocket and to guide the film into said opening and movable away from the sprocket to permit the placing of a film in engagement with the sprocket; a stationary guide extending between said sprocket and said opening and disposed to cooperate with said movably mounted guide to form a continuous guideway to said opening to prevent buckling and looping of the film between the sprocket and opening; and a closure movably mounted and enclosing said guides and sprocket and adapted to be moved to open position to permit access to the same; said movable film guide being adapted, when positioned away from said sprocket, to be engaged by said closure to prevent movement of said closure into its closed position.

14. A device of the character described including a motion picture camera including a drive shaft rotatably mounted therein; a tripod including a head pivoted on a horizontal axis secured to said camera; a crank rotatably mounted on said tripod on an axis coincident with the axis of said head; and a rotatory connection between said shaft and crank to effect the rotation of said shaft in unison with rotation of the crank.

15. A device of the character described including a motion picture camera including driving clutch element facing downwardly from the bottom of the same; a tripod detachably secured to the bottom of the camera; a second clutch element rotatably mounted in said tripod and adapted to engage said first mentioned clutch element to form a driving coupling, when the tripod is secured to the camera; a drive member rotatably mounted on said tripod; and a rotatory connection between said second clutch element and said drive member to effect the rotation of said clutch elements in unison with rotation of the drive member.

16. A device of the character described including a tripod head; a clutch element mounted therein for rotation on an axis normal to the face of said head; a clamp screw rotatably mounted in said head and disposed in parallelism with the axis of said clutch element; a gear mounted in fixed rotatory relation with said clutch; a second gear mounted in fixed rotatory relation with said clamp screw, said gears being relatively shiftable and adapted to be meshed to establish a driving relation between said clutch and clamp screw.

17. A device of the character described including a tripod head; a clutch element mounted therein for rotation on an axis normal to the face of said head; a clamp screw rotatably mounted in said head and disposed in parallelism with the axis of said clutch element; a gear mounted in fixed rotatory relation with said clutch; a second gear mounted in fixed rotatory relation with said clamp screw, said gears being relatively shiftable and adapted to be meshed to establish a driving relation between said clutch and clamp screw; and resilient means normally maintaining said gears out of mesh.

18. A device of the character described including a tripod head; a clutch element rotatably mounted therein for rotation on an axis normal to the face of said head and also mounted for limited movement longitudinally of its axis; a clamp screw rotatably mounted in said head and disposed in parallelism with the axis of said clutch element; a gear mounted in fixed rotatory connection with said screw; a second gear mounted in fixed relation with said clutch and normally out of mesh with said first mentioned gear and adapted to mesh with said first mentioned gear when said clutch element is moved in a direction inwardly of said face.

19. A device of the character described including a tripod head; a clutch element rotatably mounted therein for rotation on an axis normal to the face of said head and mounted for limited movement longitudinally of its axis; a clamp screw rotatably mounted in said head and disposed in parallelism with the axis of said clutch element and also mounted for limited movement longitudinally of its axis; resilient means for impelling said screw in the direction outwardly of said face; a gear fixed with relation to the rotation of said screw; a second gear mounted in fixed relation with said clutch and normally out of mesh with said first mentioned gear and adapted to mesh with said first mentioned gear when said clutch element is moved inwardly of said face.

20. A device of the character described including a tripod head; a clutch element rotatably mounted therein on an axis normal to the face of said head and mounted for limited movement longitudinally of its axis; a clamp screw rotatably mounted in said head and disposed in parallelism with the axis of said clutch element and also mounted for limited movement longitudinally of its axis; resilient means for impelling said screw outwardly of said face; a gear fixed with relation to the rotation of said screw; a second gear mounted in fixed relation with said clutch and disposed to be normally out of mesh with said first mentioned gear between said first mentioned gear and said face and adapted to mesh with said first mentioned gear when said clutch element is moved in a direction inwardly of said face; a second resilient means for impelling said clutch and gear in a direction outwardly of said face; and means extending outwardly of said head and having connection with said clutch to be actuated to move said clutch and said second mentioned gear against the influence of said second resilient means.

In testimony whereof, I hereunto affix my signature this 26th day of April A. D., 1919.

ALBERT SUMMERS HOWELL.